N. CALDWELL.
Hog-Lifter.
No. 168,612. Patented Oct. 11, 1875.
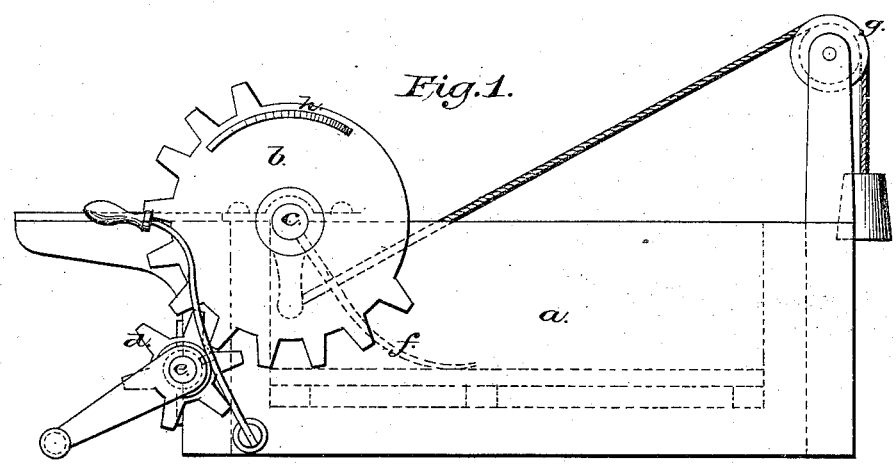
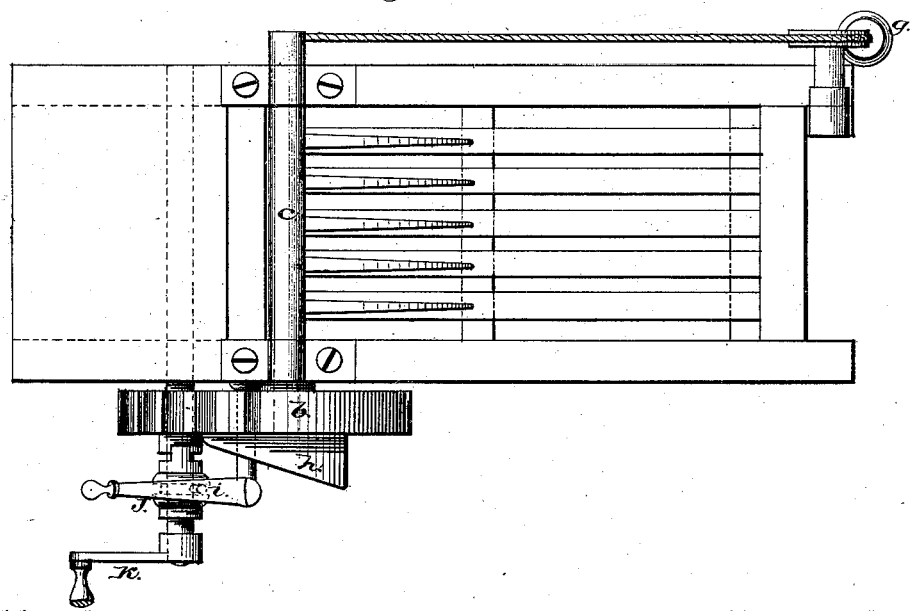
Attest:
Geo. P. Brown
Sam. B. Cooke
Inventor:
Nathaniel Caldwell

UNITED STATES PATENT OFFICE.

NATHANIEL CALDWELL, OF CINCINNATI, OHIO.

IMPROVEMENT IN HOG-LIFTERS.

Specification forming part of Letters Patent No. 168,612, dated October 11, 1875; application filed April 21, 1875.

*To all whom it may concern:*

Be it known that I, NATHANIEL CALDWELL, of Cincinnati, Ohio, have invented an Improved Hog-Lifter, of which the following is a specification:

The object of my invention is the construction of a machine to be operated by power to lift hogs out of a scalding-tank in slaughtering establishments instead of by hand, as now done; and consists of the following parts, that are new: The gearing or wheels $b$ and $d$, shaft $e$, inclined plane or stop $h$, lever $i$, clutch J, and counter-balance weight, shown in Figs. 1 and 2, running over the sheave $g$ and fastened to an arm on the end of shaft $c$ by the use of a rope or chain. Said arm is shown in dotted lines behind the large wheel $b$ in Fig. 1. By the use of power one man is enabled to do the work that now takes two to perform.

In the accompanying drawings, illustrating my invention, Figure 1 is a side elevation, showing my improvements.

$a$ is the tank in which the hog is scalded and then lifted out on the dressing-table, running back to the left of wheel $b$, by the use of the power operating on the shaft $c$, which carries the fork or cradle $f$, shown in dotted lines on the inside of tank $a$, by applying the power to the shaft $e$ by means of the crank $k$, wheel $d$, and clutch J. The wheel $d$ has lugs on its side corresponding to the ones on the clutch J.

Fig. 2 is a plan of Fig. 1, showing the different parts of the machine not shown in Fig. 1, and the inside of tank $a$, with the shaft $c$ running across the top of tank, carrying the forks or cradle $f$ on the inside of tank, and on the back or outside the crank, to which is fastened the counter-balance weight, running over the sheave $g$. On the front side is shown the wheels $b$ and $d$, shaft $e$, stop $h$, lever $i$, clutch J, and crank $k$, by which the operations of the lifter is performed by hand. In place of the crank $k$ I use a gear wheel or pulley to operate it when in actual work or operation, thus making power take the place of what is now done by hand in all slaughtering-houses using such machines.

When the above-described machine is thus combined its operation will be as follows: When the hog is scalded in tank $a$, and is to be lifted out onto the dressing-table it is floated along onto the fork or cradle $f$ by the man in charge of the scalding-tank, when the clutch J is thrown in by the lever $i$ by hand, when the gear-wheels $d$ and $b$ start to work and lift the hog up and place it on the table ready for dressing. When the cradle or fork $f$ has been brought up far enough to place the hog on the table, the inclined plane or stop $h$, fastened to the side of the large wheel $b$, will strike the lever $i$ and throw the clutch J out, when the cradle or fork will drop back into the tank and assume the proper position to receive another hog. The counter-balance weight, operating over the sheave $g$ on the crank on the outside of the tank on shaft $c$, is for the purpose of preventing cradle $f$ dropping into the tank with a slam. After having been thrown out of gear by the stop $h$ the shaft $e$ will continue to run, and the clutch J will revolve with it, but will slip endwise on the shaft, to throw in and out of contact with the corresponding clutch on the wheel $d$, by reason of working on what is termed a feather. The object of cutting away a portion of the cogs on the large wheel $b$ is to prevent the wheel and cradle from going too far over in case the stop $h$ fails to work in time to throw out the clutch J. The wheel will stop of itself when it runs out of gear into the blank space.

I do not claim, broadly, the making of a hog-lifter consisting of the shaft $c$ and fork or cradle $f$, as that is not new; but What I do claim is—

The above-described hog-lifter, consisting of the gear-wheel $b$, having a part of the cogs removed, and provided with the stop $h$, the wheel $d$, lever $i$, clutch J, the arms $f$ attached to the shaft $c$, the counter-balance weight working over the sheave $g$, arranged and combined to operate substantially as set forth.

NATHANIEL CALDWELL.

Attest:
GEO. P. BROWN,
SAM. B. COOKE.